(12) United States Patent
Toda et al.

(10) Patent No.: US 10,094,512 B2
(45) Date of Patent: Oct. 9, 2018

(54) ACCESSORY SUPPORT STRUCTURE FOR VEHICLE ENGINE

(71) Applicant: MAZDA MOTOR CORPORATION, Hiroshima (JP)

(72) Inventors: Tadatomo Toda, Hiroshima (JP); Seiji Namba, Hiroshima (JP); Masayuki Furutani, Higashihiroshima (JP); Keiichi Kamimura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/694,264

(22) Filed: Sep. 1, 2017

(65) Prior Publication Data

US 2018/0066577 A1    Mar. 8, 2018

(30) Foreign Application Priority Data

Sep. 7, 2016  (JP) ................................ 2016-174478

(51) Int. Cl.
| | |
|---|---|
| *F16M 13/02* | (2006.01) |
| *F02B 37/00* | (2006.01) |
| *B60R 11/00* | (2006.01) |
| *F02B 67/06* | (2006.01) |

(52) U.S. Cl.
CPC ............ *F16M 13/02* (2013.01); *B60R 11/00* (2013.01); *F02B 37/00* (2013.01); *B60R 2011/008* (2013.01); *B60R 2011/0038* (2013.01); *B60Y 2306/01* (2013.01); *B60Y 2306/09* (2013.01); *F02B 67/06* (2013.01)

(58) Field of Classification Search
CPC ......... F02B 67/06; F16M 13/02; B60R 11/00; B60R 2011/0038; B60R 2011/008; B60Y 2306/09; B60Y 2306/01
USPC ..... 248/548, 201, 205.6, 909, 554, 555, 675
See application file for complete search history.

(56) References Cited

U.S. PATENT DOCUMENTS

| | | | | |
|---|---|---|---|---|
| 3,022,778 A | * | 2/1962 | Stemen .................... | H02K 5/00 123/195 E |
| 5,938,169 A | * | 8/1999 | Ogawa ..................... | F16H 7/14 123/195 A |
| 6,196,758 B1 | * | 3/2001 | Scarborough ........... | F16B 21/09 403/109.3 |

(Continued)

FOREIGN PATENT DOCUMENTS

| | | |
|---|---|---|
| JP | 2001-020752 A | 1/2001 |
| JP | 2004-360600 A | 12/2004 |

(Continued)

*Primary Examiner* — Muhammad Ijaz
(74) *Attorney, Agent, or Firm* — Studebaker & Brackett PC

(57) ABSTRACT

An accessory support structure for a vehicle engine includes a pair of accessory-side supports provided on the engine accessory, and a pair of engine-side supports provided on the engine body. The engine-side supports each have a shaft hole into which a bolt is inserted, a slot closer to the engine body than the shaft hole is, and extending substantially horizontally, and an intermediate portion interposed between the shaft hole and the slot to restrict movement of the bolt. The engine-side supports each remove a restriction imposed by the intermediate portion and guide the bolt from the shaft hole to the slot if an external force acting on the alternator toward the engine body exceeds a predetermined threshold.

7 Claims, 11 Drawing Sheets

(56) References Cited

U.S. PATENT DOCUMENTS

| | | | |
|---|---|---|---|
| 8,511,272 B2* | 8/2013 | Koyama | F02F 7/0068 123/195 A |
| 9,651,194 B1* | 5/2017 | Rosen | B64D 13/08 |
| 2005/0011695 A1 | 1/2005 | Murata et al. | |
| 2006/0090555 A1* | 5/2006 | Krampitz | G01M 15/02 73/116.04 |
| 2009/0159038 A1* | 6/2009 | Koyama | F02B 67/00 123/195 A |
| 2015/0251536 A1* | 9/2015 | Sullivan | B60K 25/02 248/674 |
| 2016/0096484 A1* | 4/2016 | Vich | F16B 13/126 248/231.9 |

FOREIGN PATENT DOCUMENTS

| | | |
|---|---|---|
| JP | 2007-218189 A | 8/2007 |
| JP | 2014-234758 A | 12/2014 |

* cited by examiner

REAR ←——— HORIZONTAL DIRECTION ———→ FRONT
(AWAY FROM ENGINE BODY)    (TOWARD ENGINE BODY)

ACCESSORY SUPPORT STRUCTURE FOR VEHICLE ENGINE

CROSS-REFERENCE TO RELATED APPLICATION

This application claims priority to Japanese Patent Application No. 2016-174478 filed on Sep. 7, 2016, the entire disclosure of which is hereby incorporated by reference.

BACKGROUND

The present disclosure relates to an accessory support structure for a vehicle engine.

Japanese Unexamined Patent Publication No. 2007-218189 discloses an accessory support structure for a vehicle engine. Specifically, Japanese Unexamined Patent Publication No. 2007-218189 describes a pair of supports as a device for mounting an engine accessory. The pair of supports are provided on an engine body (an internal combustion engine), and arranged in an up and down direction. A pin shaft is pivotably fitted to a lower one of these supports. The other upper one of these supports has a slot which is formed in the shape of a segment of a circle drawn around the pin shaft and into which a bolt is inserted. According to Japanese Unexamined Patent Publication No. 2007-218189 described above, a predetermined external force acting on the engine accessory toward the engine body causes the bolt to move along the slot. This allows the entire engine accessory to move toward the engine body.

To absorb the collision load acting on a vehicle, it is recommended that a so-called crush stroke be provided. To provide a crush stroke, when a collision load is applied to the engine accessory, the entire engine accessory may be moved toward the engine body as described in Japanese Unexamined Patent Publication No. 2007-218189 described above.

However, according to the configuration described in Japanese Unexamined Patent Publication No. 2007-218189 described above, for example, if another engine accessory is attached above the engine accessory supported by the device for mounting the engine accessory, the supports each having the slot is interposed between the two engine accessories. As a result, the vertical distance between the two engine accessories increases by the degree to which the slot is curved to form the shape of a segment of a circle. This may cause, for example, a common power transmission belt (an endless power transmission member) wound around the two engine accessories to flutter and to make noise.

In addition, according to the configuration described in Japanese Unexamined Patent Publication No. 2007-218189 described above, the bolt is merely inserted into the slot. Thus, when the endless power transmission member is wound in the step of assembling an engine, the bolt unintentionally moves due to the tension of the endless power transmission member. This may cause the positioning of the engine accessories to vary. Such variations are not beneficial to provide equal quality.

In view of the foregoing background, it is therefore an object of the present disclosure to allow an accessory support structure for a vehicle engine to provide a crush stroke while reducing the degree to which an endless power transmission member flutters and stabilizing the positioning of engine accessories.

SUMMARY

According to an aspect of the present disclosure, an accessory support structure for a vehicle engine including an engine body mounted in a vehicle, and an engine accessory disposed along an outer surface of the engine body includes a pair of accessory-side supports provided on the engine accessory; and a pair of engine-side supports provided on the engine body, the engine-side supports being disposed at locations corresponding to the accessory-side supports, respectively. The engine accessory is fixed through a common support shaft inserted into both of each accessory-side support and one of the engine-side supports corresponding to the accessory-side support.

The accessory-side supports each have a shaft hole into which the common support shaft is inserted. The engine-side supports each have a shaft hole into which the common support shaft is inserted, a slot adjacent to the shaft hole of the engine-side support in a substantially horizontal direction and closer to the engine body than the shaft hole of the engine-side support is, the slot extending substantially horizontally, an intermediate portion interposed between the shaft hole of the engine-side support and the slot to restrict movement of the common support shaft toward the engine body. The shaft hole, the slot, and the intermediate portion of each engine-side support are arranged in a substantially horizontal direction.

The engine-side supports are each configured such that an external force that has acted on the engine accessory toward the engine body acts on an associated one of the intermediate portions through the common support shaft, and a strength of each intermediate portion is set to remove a restriction on the common support shaft if the external force exceeds a predetermined threshold.

The "support shaft" includes a fastening bolt.

According to this configuration, the two accessory-side supports each have the shaft hole into which the support shaft is inserted. Consequently, the engine accessory moves integrally with the support shaft through the shaft hole when the external force acts on the engine accessory. Meanwhile, the two engine-side supports each have not only the shaft hole into which the support shaft is inserted just like the accessory-side supports, but also the slot closer to the engine body than the shaft hole is and extending horizontally, and the intermediate portion interposed between the shaft hole and the slot. This intermediate portion usually restricts the movement of the support shaft toward the engine body.

If an external force acts on the engine accessory toward the engine body, the intermediate portion removes a restriction on the support shaft in accordance with the magnitude of the external force.

In other words, if an external force acts on the engine accessory as described above so that each intermediate portion removes the restriction, the support shaft is guided from the shaft hole to the slot in the engine-side support. This slot extends horizontally toward the engine body. Thus, not only the support shaft but also the engine accessory moving integrally with the support shaft moves toward the engine body in accordance with the external force.

The pair of support shafts both move toward the engine body so that the entire engine accessory moves toward the engine body. A crush stroke equal to the distance over which the engine accessory moves can be provided.

In addition, the slots of the engine-side supports both extend horizontally. Thus, for example, if the engine-side supports are arranged in an up and down direction, and another engine accessory is attached either above or below the engine accessory, the distance between the engine accessories can be reduced. This can reduce the degree to which a common endless power transmission member wound around the two engine accessories flutters, and can, in turn, reduce noise caused by the fluttering.

While no predetermined external force acts on the support shaft inserted into the shaft hole, the intermediate portion restricts the movement of the support shaft. This can stabilize the positioning of the engine accessory, and can, in turn, provide uniform quality.

In this manner, while the degree to which the endless power transmission member flutters is reduced, and the positioning of the engine accessory is stabilized, a crush stroke is provided.

According to another aspect of the present disclosure, an accessory support structure for a vehicle engine includes: an engine body mounted in a vehicle; an engine accessory disposed along an outer surface of the engine body; a pair of accessory-side supports provided on the engine accessory; and a pair of engine-side supports provided on the engine body, the engine-side supports being disposed at locations corresponding to the accessory-side supports, respectively. The engine accessory is fixed through a common support shaft inserted into both of each accessory-side support and one of the engine-side supports corresponding to the accessory-side support.

The accessory-side supports each have a shaft hole into which the common support shaft is inserted, a slot adjacent to the shaft hole in a substantially horizontal direction and further away from the engine body than the shaft hole is, the slot extending substantially horizontally, an intermediate portion interposed between the shaft hole and the slot to restrict movement of the common support shaft in a direction away from the engine body. The shaft hole, the slot, and the intermediate portion of each accessory-side support are arranged in a substantially horizontal direction. The engine-side supports each have a shaft hole into which the common support shaft is inserted.

The accessory-side support are each configured such that an external force that has acted on the engine accessory toward the engine body acts on an associated one of the intermediate portions through the common support shaft, and a strength of each intermediate portion is set to remove a restriction on the common support shaft if the external force exceeds a predetermined threshold.

According to this configuration, the two engine-side supports each have the shaft hole into which the support shaft is inserted. Thus, the support shaft is fixed to the engine body through the shaft hole. Meanwhile, the two accessory-side supports each have not only the shaft hole into which the common support shaft is inserted just like the accessory-side supports, but also the slot being further away from the engine body than the shaft hole is and extending horizontally, and the intermediate portion interposed between the shaft hole and the slot. This intermediate portion usually restricts the movement of the support shaft relative to the engine accessory.

According to this configuration, if a predetermined external force acts on the engine accessory toward the engine body as in the configuration described above, the accessory-side supports each remove a restriction imposed by an associated one of the intermediate portions. This allows the engine accessory to move relative to the pair of support shafts and the engine body. The pair of support shafts approaching the engine accessory in accordance with the external force described above allows the entire engine accessory to move toward the engine body. This can provide a crush stroke.

In addition, just like the configuration described above, the degree to which the power transmission belt flutters can be reduced, and the positioning of the engine accessory can be stabilized.

In this manner, while the degree to which the power transmission belt flutters is reduced, and the positioning of the engine accessory is stabilized, a crush stroke is provided.

The intermediate portion may have a through hole having a narrower vertical width than the shaft hole, the through hole having two horizontal ends continuous with the shaft hole and the slot, respectively.

According to this configuration, the shaft hole, the intermediate portion, and the slot can be formed by changing the shape of the through hole of either each engine-side support or each accessory-side support. Specifically, the through hole can be sectioned into the shaft hole, the intermediate portion, and the slot simply by narrowing a portion of the through hole extending horizontally. This helps easily form the engine-side supports each having the intermediate portion, or the accessory-side supports each having the intermediate portion.

The engine body may be mounted such that the engine accessory faces toward a front of the vehicle. The vehicle may include a pair of side frames respectively disposed on both sides of the engine body in a width direction of the vehicle and extending in a longitudinal direction of the vehicle, and a front frame bridged between front ends of the pair of side frames. The engine accessory may be disposed at a height equal to that of the front frame.

According to this configuration, for example, if a collision load is applied from the front of the vehicle to the vehicle, and the front frame moves backward toward the engine, then the front frame collides with the engine accessory. This allows the intermediate portion to effectively absorb the load applied to the engine accessory via the front frame. This helps improve occupant protection performance.

As can be seen from the foregoing description, according to the accessory support structure for a vehicle engine, while the degree to which a power transmission belt flutters is reduced, and the positioning of an engine accessory is stabilized, a crush stroke is provided.

DETAILED DESCRIPTION

Figure 1:
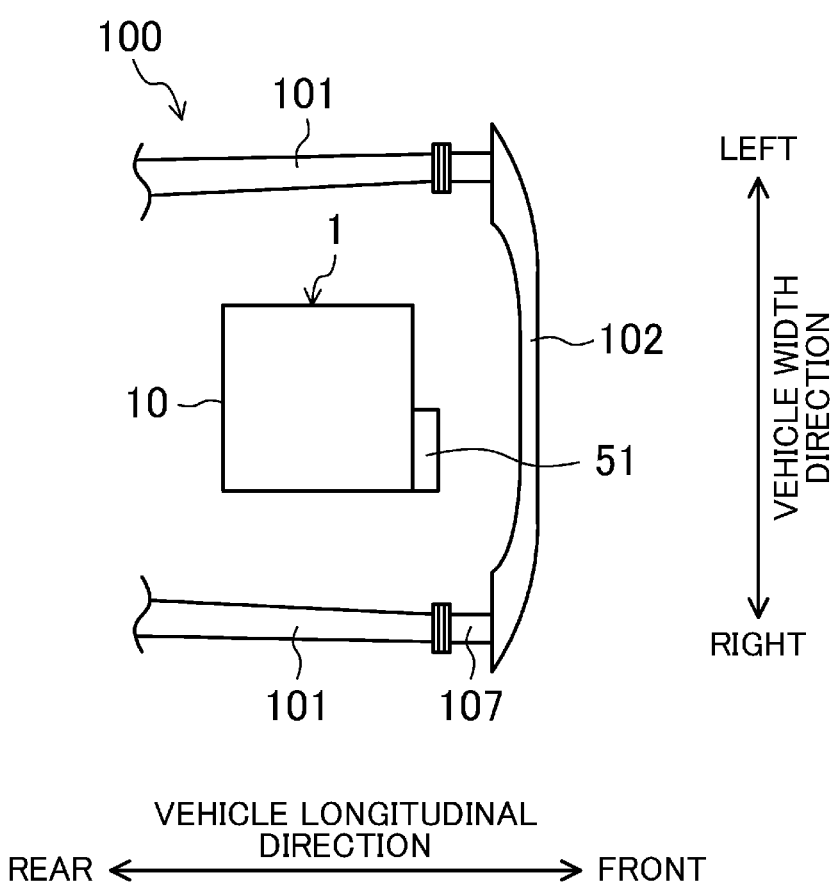
FIG. 1 is a top view illustrating a front portion of a motor vehicle with an engine including an accessory support structure for a vehicle engine.
Figure 2:
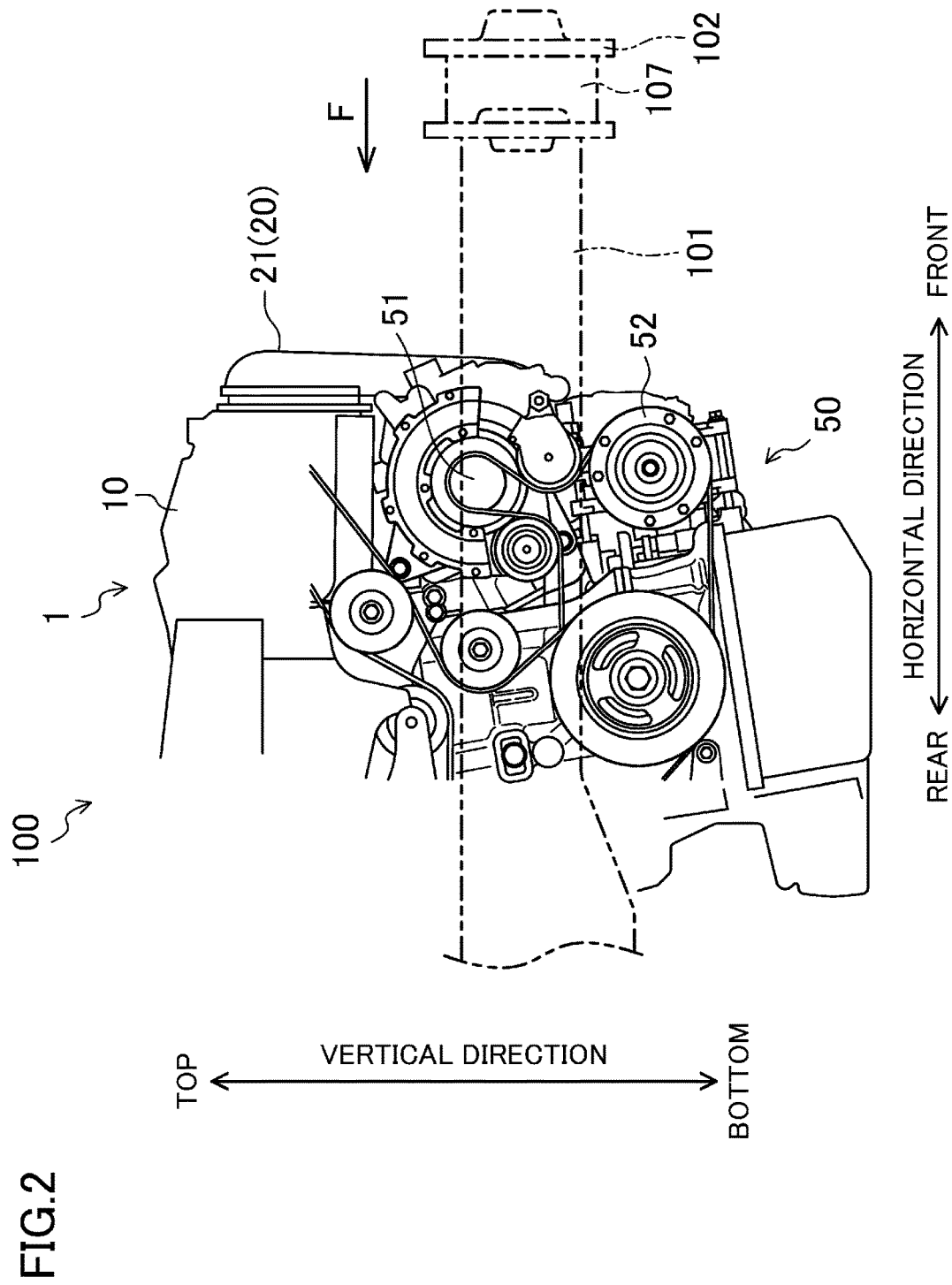
FIG. 2 is a side view illustrating the front portion of the motor vehicle with the engine.
Figure 3:
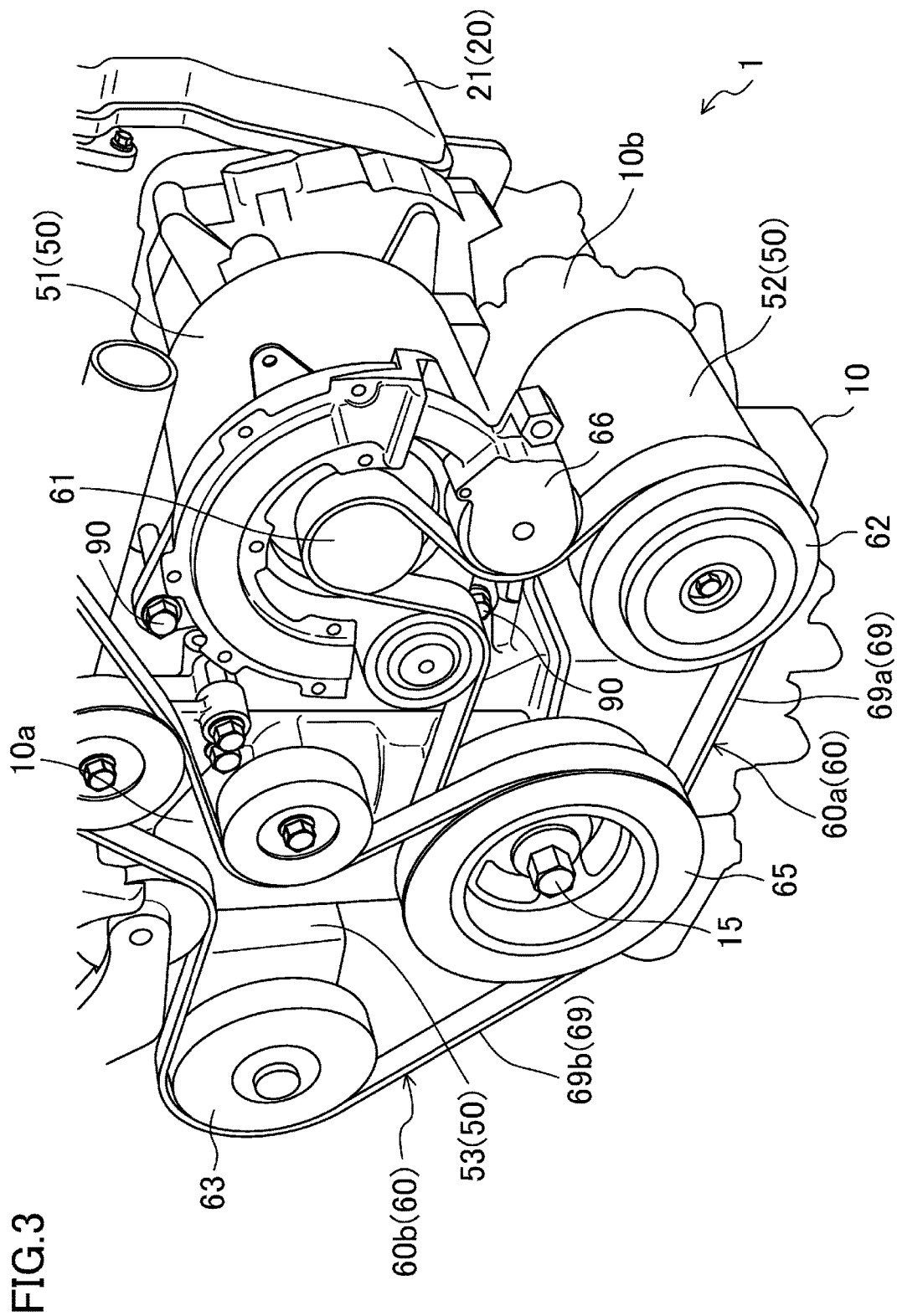
FIG. 3 is a perspective view of the engine as viewed from the right end thereof.
Figure 4:
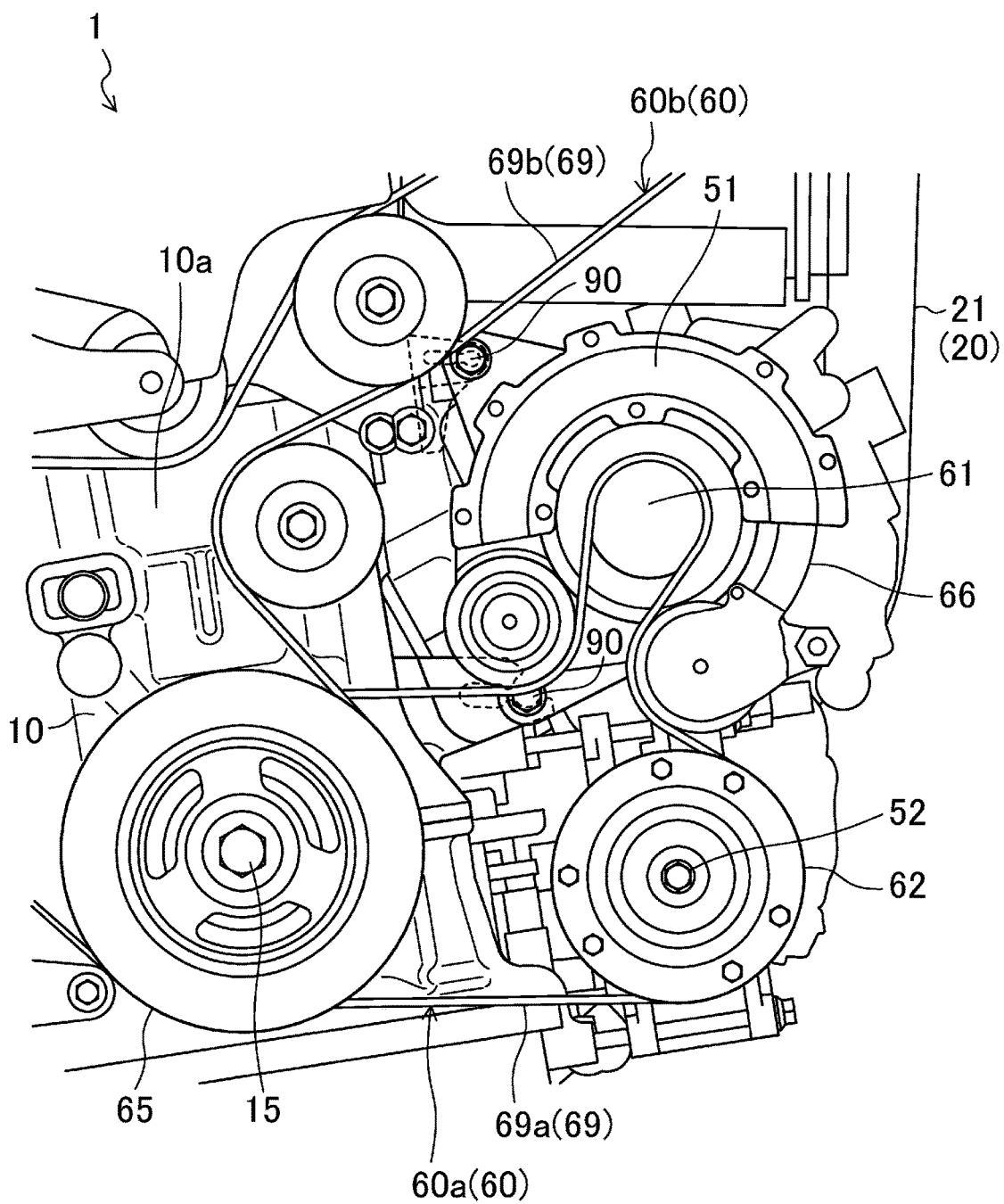
FIG. 4 is a side view of the engine as viewed from the right end thereof.
Figure 6:
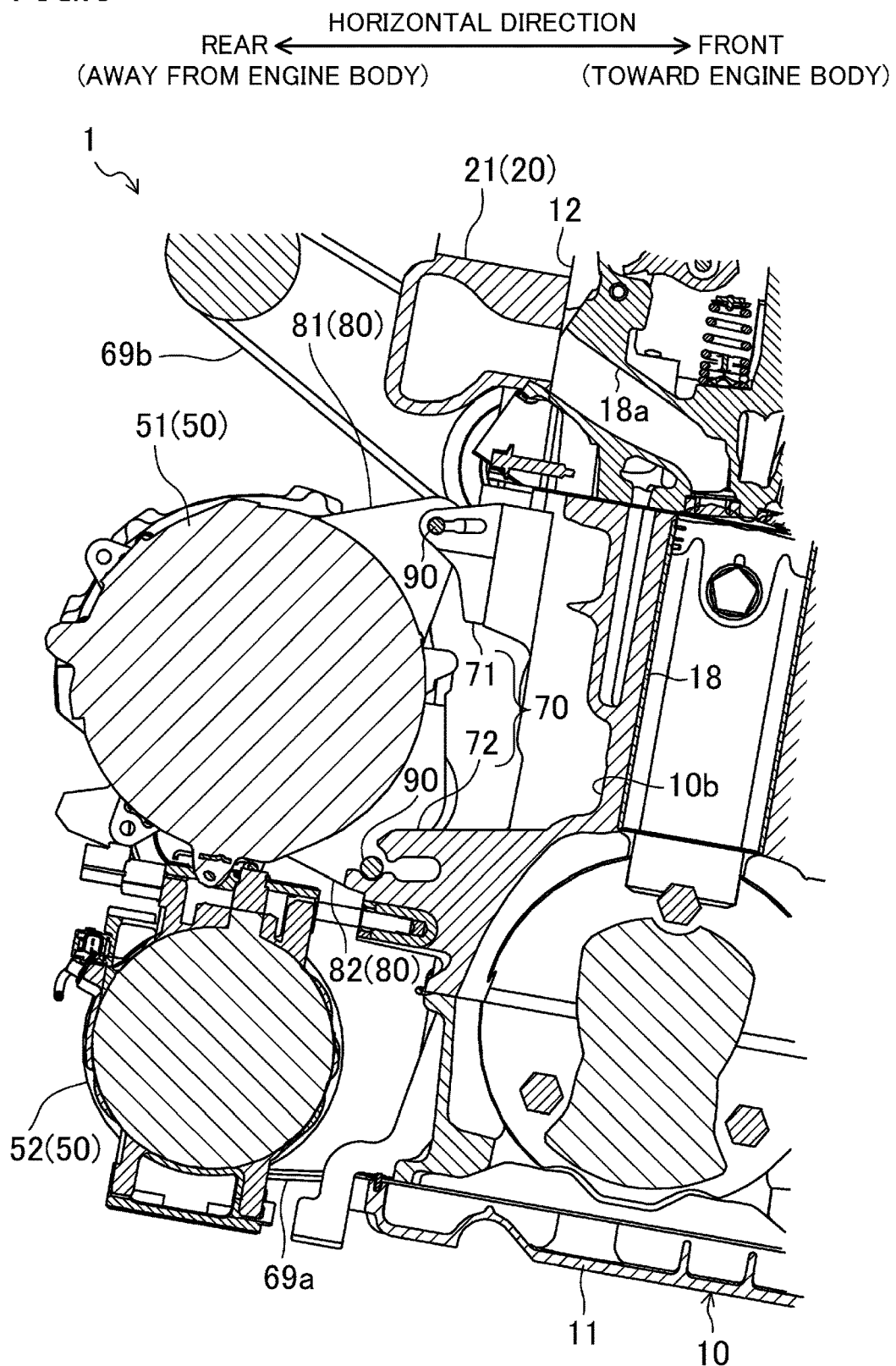
FIG. 6 is a longitudinal cross-sectional view of the engine.

An accessory support structure for a vehicle engine will now be described with reference to the drawings. Note that the following description is illustrative. FIG. 1 is a top view illustrating a front portion of a motor vehicle with an engine including an accessory support structure for a vehicle engine according to an embodiment of the present disclosure. FIG. 2 is a side view illustrating the front portion. FIG. 3 is a perspective view of the engine as viewed from the right end thereof. FIG. 4 is a side view of the engine as viewed from the right end thereof. FIG. 6 is a longitudinal cross-sectional view of the engine.

A motor vehicle 100 is configured as a front-engine, front-wheel-drive vehicle. In other words, a drive shaft (not shown) that rotationally drives front wheels and an engine 1 coupled to the drive shaft are adjacent to each other in a front portion of the motor vehicle 100. Thus, the right side of the paper on which FIG. 1 is drawn corresponds to the front side of the motor vehicle 100.

The term "front" in the following description refers to the "front" side of the motor vehicle 100, and corresponds to the right side of the paper on which FIG. 1 is drawn. Likewise, the term "rear" refers to the "rear" side of the motor vehicle 100, and corresponds to the left side of the paper on which FIG. 1 is drawn. The term "left" refers to one side of the motor vehicle 100 in the width direction thereof, and corresponds to the upper side of the paper on which FIG. 1 is drawn. The term "right" refers to the other side of the motor vehicle 100 in the width direction thereof, and corresponds to the lower side of the paper on which FIG. 1 is drawn. Likewise, in each of the other drawings, the directions corresponding to these terms are referred to as "front," "rear," "left," and "right," respectively.

A vehicle body of the motor vehicle 100 is configured as a combination of a plurality of frames. In particular, the front portion of the vehicle body includes a pair of front side frames (side frames) 101 and a bumper reinforcement 102 (a front frame). The pair of front side frames 101 are disposed on both sides of the engine 1 in the width direction of the vehicle, and extend in the longitudinal direction of the vehicle. The bumper reinforcement 102 is disposed between the front ends of the pair of front side frames 101.

The front side frames 101 have a closed cross section. The pair of right and left front side frames 101 are spaced apart from each other in the width direction of the motor vehicle 100, and extend forward from a portion of a floor behind the front side frames 101 (not shown). The engine 1 is disposed between the front side frames 101. The front side frames 101 are designed such that in the event of a frontal collision of the motor vehicle 100, the front side frames 101 positively buckle so as to prevent a rear portion of a passenger compartment from being deformed, and absorb impact transmitted from the bumper reinforcement 102 via crash cans 107 to the front side frames 101.

The bumper reinforcement 102 is attached to front end portions of the front side frames 101 with the respective crash cans 107 interposed therebetween. The height of the bumper reinforcement 102 is substantially equal to that of an alternator 51 described below.

The engine 1 mounted in the motor vehicle 100 is a multi-cylinder internal combustion engine. Specifically, the engine 1 disclosed herein is an inline-four gasoline engine. However, the engine 1 should not be limited to a gasoline engine. An accessory support structure indicated below may be used in a so-called diesel engine.

The engine 1 is "transversely" mounted such that the direction in which the four cylinders are arranged substantially coincides with the vehicle width direction, and is configured as a so-called front intake and rear exhaust engine. That is to say, the engine 1 includes an engine body 10 with a crankshaft (output shaft) 15, an air intake device 20 connected to a front portion of the engine body 10, and an exhaust device (not shown) connected to a rear portion of the engine body 10.

The engine 1 further includes a plurality of engine accessories 50, and an accessory drive system 60. The engine accessories 50 are arranged along a front portion of the engine body 10 (an outer surface thereof located laterally outward of the output shaft). The accessory drive system 60 is disposed near one end (the right end) of the engine body 10 in the direction in which the major axis of the crankshaft 15 extends (the direction in which the output shaft extends), and is configured to drivably couple the engine body 10 and the engine accessories 50 together.

Specifically, the air intake device 20 allows intake air (fresh air) introduced from outside thereinto to pass therethrough, and supplies the air into cylinders 18 (see FIG. 6) of the engine body 10. To be specific, the air intake device 20 includes an intake manifold 21 serving as a portion of an intake pipe. The intake manifold 21 is connected to the cylinders 18 through intake ports 18a of the engine body 10. Note that the intake manifold 21 according to this embodiment is configured to positively crush when a collision load is applied from the front to the intake manifold 21.

The engine body 10 is configured to combust, in the cylinders 18, an air-fuel mixture of fuel and intake air supplied from the air intake device 20. Specifically, the engine body 10 includes a cylinder block 11, and a cylinder head 12 assembled onto the cylinder block 11 and forming the cylinders 18 together with the cylinder block 11. The cylinder block 11 and the cylinder head 12 are arranged in this order from bottom to top in a vertical direction. Power generated by combusting the air-fuel mixture is delivered to the outside through the crankshaft 15 provided in the cylinder block 11.

A right end portion of the crankshaft 15 protrudes beyond a right portion 10a of the engine body 10 as shown in FIG. 3, for example. A crankshaft pulley 65 configured to rotate integrally with the crankshaft 15 is attached to the right end portion. The crankshaft pulley 65 has a disk shape, which is perpendicular to the direction in which the output shaft extends, and has an outer peripheral surface around which a plurality of power transmission belts (endless power transmission members) 69 are wound. The power transmission belts 69 all have an endless belt shape, and are disposed to the right of the engine body 10 to each extend in a loop along the right portion 10a of the engine body 10. In this embodiment, examples of the power transmission belts 69 include an inner belt 69a wound near the right portion 10a of the engine body 10, and an outer belt 69b wound at a location closer to the outside than the location at which the inner belt 69a is wound is (on the right side of the inner belt 69a).

The engine accessories 50 include an alternator 51 and an air compressor 52 disposed along a front portion (a side portion on the intake side) 10b of the engine body 10, and a water pump 53 disposed along a rear portion (a side portion on the exhaust side) of the engine body 10.

Specifically, the alternator 51 generating alternating current for use in an electrical system and the air compressor 52 for air conditioning are arranged near the right end of the front portion 10b of the engine body 10 in this order from top to bottom. As shown in FIGS. 3-4, an alternator drive pulley 61 is attached to a right end portion of the alternator 51. The alternator drive pulley 61 has a disk shape having a center axis extending parallel to the direction in which the center axis of the crankshaft pulley 65 extends, and is configured to drive the alternator 51. Likewise, an air compressor drive pulley 62 is attached also to a right end portion of the air compressor 52. The air compressor drive pulley 62 has a disk shape having a center axis extending parallel to the direction in which the center axis of the crankshaft pulley 65 extends, and is configured to drive the air compressor 52. The above-described inner belt 69a is wound around the outer peripheral surface of the alternator drive pulley 61 and the outer peripheral surface of the air compressor drive pulley 62.

Note that in this embodiment, the alternator 51 is mounted to protrude forward beyond the air compressor 52. A support structure for the alternator 51 will be described below.

Meanwhile, the water pump 53, which functions as a pump to circulate an engine coolant, is disposed near the right end of the rear portion of the engine body 10. This water pump 53 forms part of a cooling system of the engine 1. A water pump drive pulley 63 is attached also to a right end portion of the water pump 53. The water pump drive pulley 63 has a disk shape having a center axis extending parallel to the direction in which the center axis of the crankshaft pulley 65 extends, and is configured to drive the water pump 53. The water pump drive pulley 63 is located outward (rightward) of the alternator drive pulley 61 and the air compressor drive pulley 62, and has an outer peripheral surface around which the above-described outer belt 69b is wound.

The accessory drive system 60 is disposed near the right end of the engine body 10, and includes the crankshaft pulley 65, the alternator drive pulley 61, the air compressor drive pulley 62, the water pump drive pulley 63, a plurality of driven pulleys (omitted for further information), an automatic tensioner (e.g., a double arm tensioner 66), the inner belt 69a, and the outer belt 69b.

In this embodiment, the crankshaft pulley 65, the alternator drive pulley 61, the air compressor drive pulley 62, the double arm tensioner 66, and the inner belt 69a form a first drive system 60a. On the other hand, the crankshaft pulley 65, the water pump drive pulley 63, the driven pulleys, and the outer belt 69b form a second drive system 60b independent of the first drive system 60a.

Figure 5:
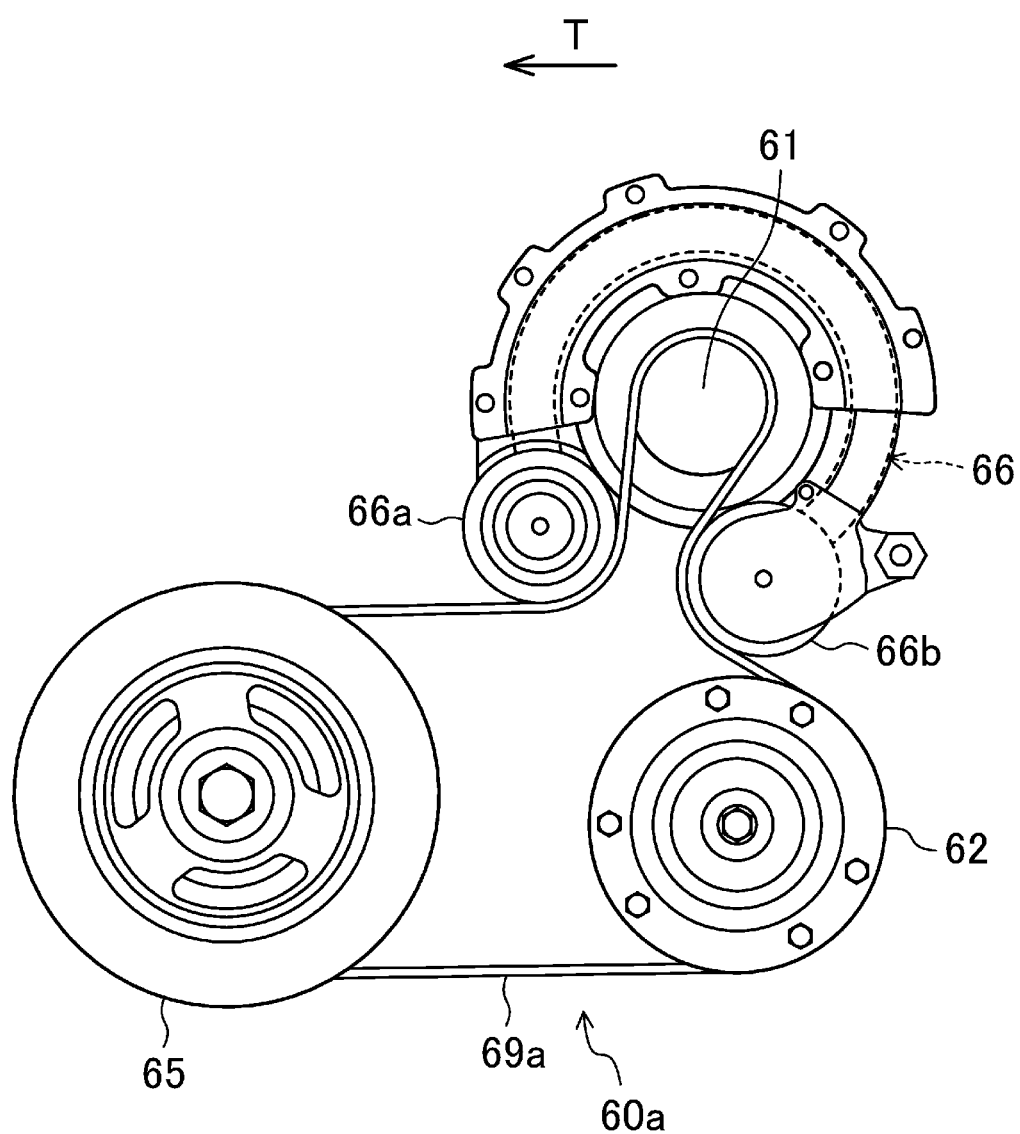
FIG. 5 schematically illustrates an accessory drive system.

FIG. 5 schematically illustrates the first drive system 60a. As shown in FIG. 5, operation of the engine body 10 allows the crankshaft pulley 65 to be rotationally driven via the crankshaft 15. Rotation of the crankshaft pulley 65 allows its power to be transmitted through the inner belt 69a to the alternator drive pulley 61 and the air compressor drive pulley 62. Power transmitted to each of the pulleys is used to drive an associated one of the accessories. In other words, the alternator drive pulley 61 rotates under the transmitted power, and actuates the alternator 51. Likewise, the air compressor drive pulley 62 actuates the air compressor 52. In this embodiment, the first drive system 60a includes the double arm tensioner 66 described above. This double arm tensioner 66 is a belt tensioner including two tension rollers 66a and 66b. The two tension rollers 66a and 66b pressurize the outer peripheral surface of the inner belt 69a wound around the alternator drive pulley 61 from both the upstream and downstream sides of rotation of the alternator drive pulley 61. Provision of the double arm tensioner 66 allows the tension T of the inner belt 69a to be kept substantially constant.

Although not described in detail, a similar statement applies to the second drive system 60b. That is to say, operation of the engine body 10 allows the crankshaft pulley 65 to be rotationally driven via the crankshaft 15. Rotation of the crankshaft pulley 65 allows its power to be transmitted through the outer belt 69b to the water pump drive pulley 63. The water pump drive pulley 63 rotates under the transmitted power, and actuates the water pump 53. The automatic tensioner of the second drive system 60b allows the tension of the outer belt 69b to be also kept substantially constant.

The movement of the alternator 51 according to this embodiment relative to the engine body 10 is restricted. Specifically, the alternator 51 is supported so as to be prevented from moving toward, and away from, the engine body 10. However, the alternator 51 is configured to remove such a restriction in a situation where an external force F greater than a predetermined threshold Ft acts on the alternator 51 toward the engine body 10. Removing a restriction on the relative movement allows the alternator 51 to move toward the engine body 10 in accordance with the external force F.

A support structure for the alternator 51 according to this embodiment will now be described in detail.

Figure 7:
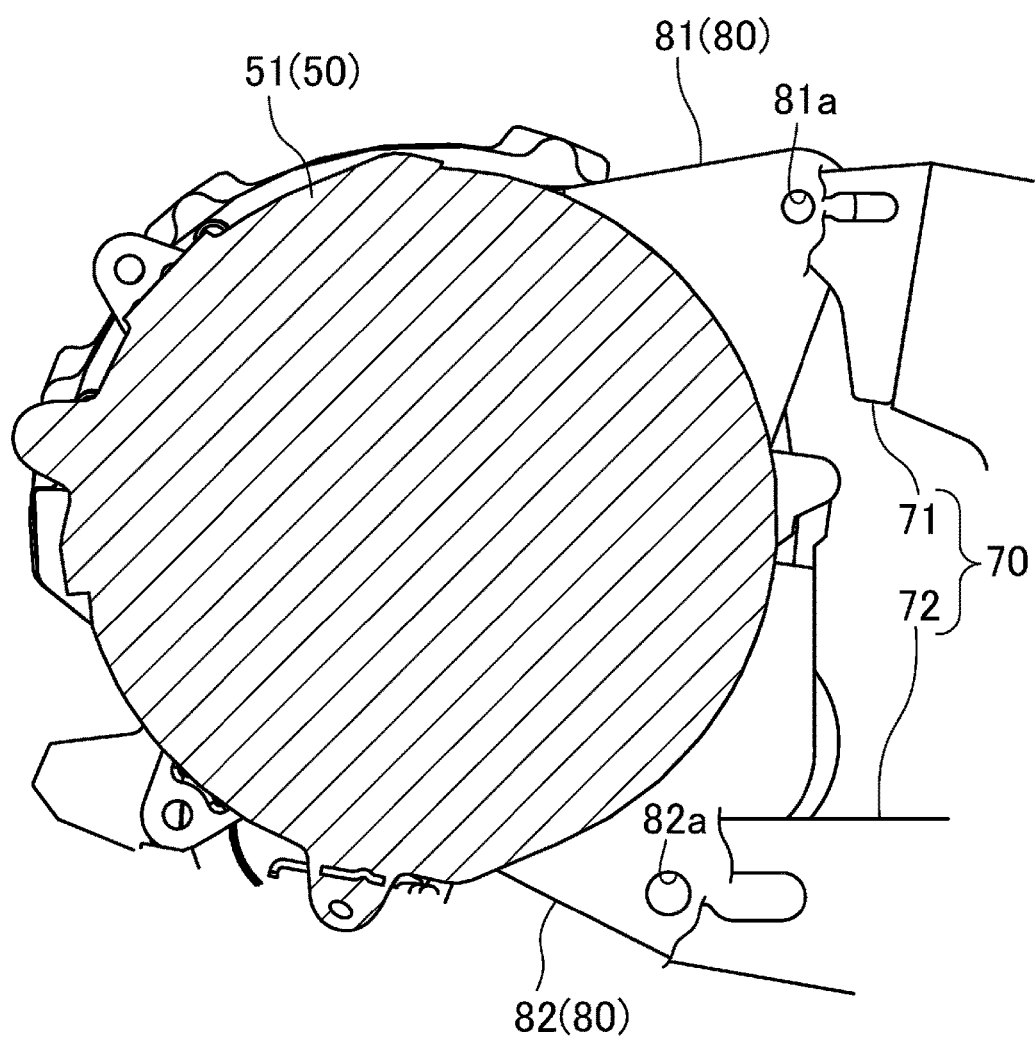
FIG. 7 illustrates accessory-side supports.
Figure 8:
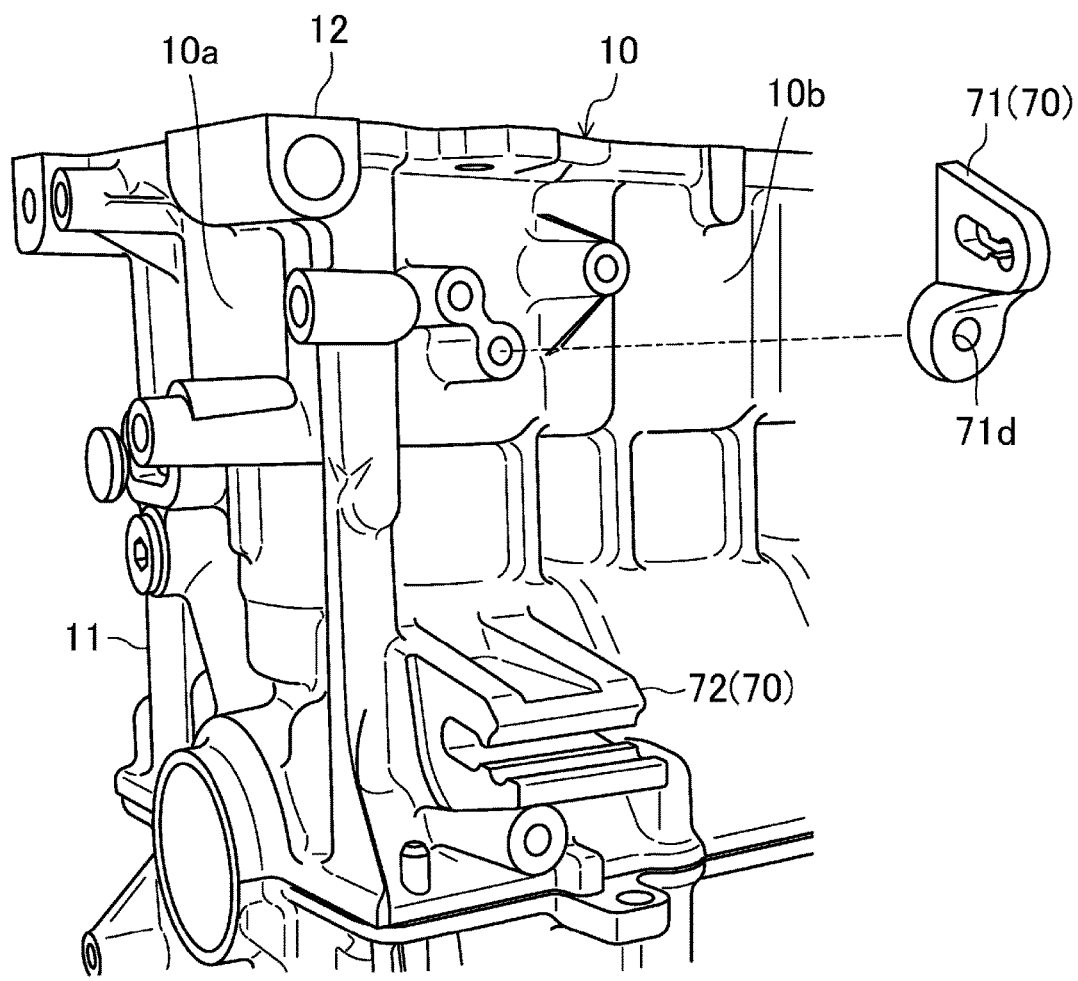
FIG. 8 illustrates engine-side supports.
Figure 9:
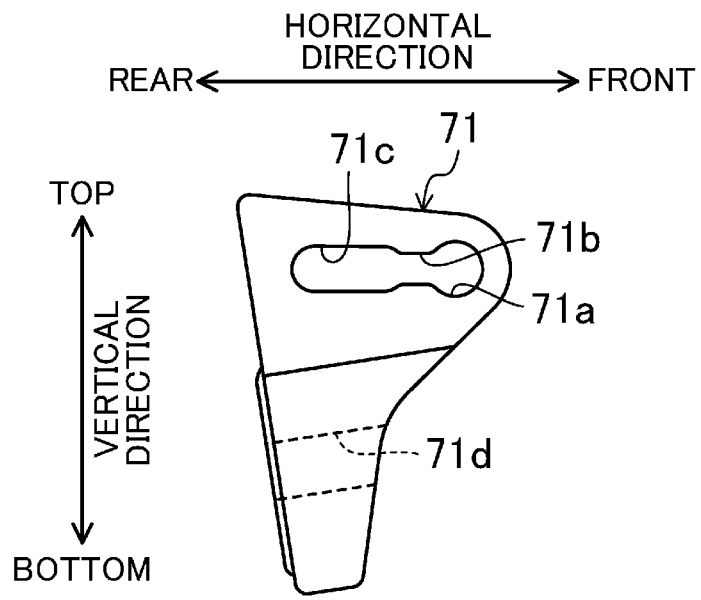
FIG. 9 illustrates one of the engine-side supports.
Figure 10:
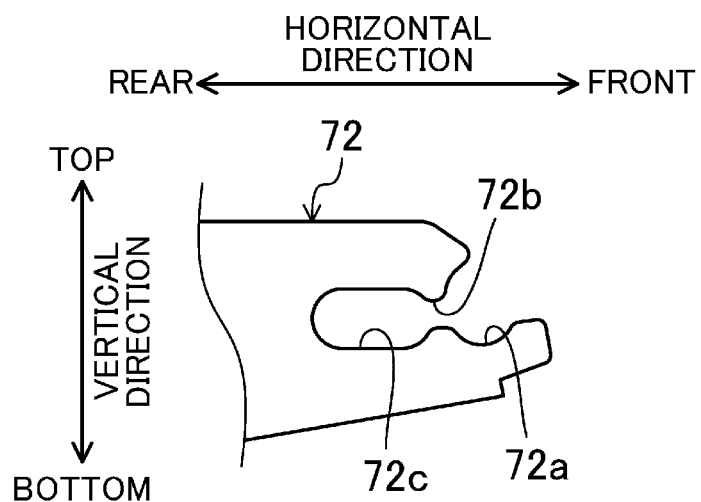
FIG. 10 illustrates the other one of the engine-side supports.

FIG. 7 illustrates a pair of accessory-side supports 80 for the alternator 51. FIG. 8 is a perspective view illustrating a pair of engine-side supports 70 for the alternator 51. FIG. 9 illustrates one of the engine-side supports 70 (denoted by reference character 71). FIG. 10 illustrates the other one of the engine-side supports 70 (denoted by reference character 72).

As shown in FIGS. 6-8, the engine 1 according to this embodiment includes the pair of accessory-side supports 80 and the pair of upper and lower engine-side supports 70. The pair of accessory-side supports 80 are provided on the alternator 51, and are arranged in an up and down direction. The pair of upper and lower engine-side supports 70 are provided on the engine body 10, and face the accessory-side supports 80, respectively. The alternator 51 is fixed to one of the accessory-side supports 80 and one of the engine-side supports 70 facing the one of the accessory-side supports 80 through a bolt 90 inserted into these supports 70 and 80 in the direction in which the output shaft extends. Note that the bolt 90 is an exemplary "common support shaft."

Specifically, the accessory-side supports 80 are integrated with the alternator 51, and include a first accessory-side support 81, and a second accessory-side support 82 located below the first accessory-side support 81. The first and second accessory-side supports 81 and 82 both protrude from a rear portion of the alternator 51 (a portion of the alternator 51 facing the front portion 10b of the engine body 10 in the mounted state) to each have a substantial flange shape. As shown in FIG. 7, the first accessory-side support 81 has a shaft hole 81a through which the bolt 90 is inserted in the direction in which the output shaft extends (the direction perpendicular to the paper on which FIG. 5 is drawn). This shaft hole 81a has a circular cross section, and has a slightly larger diameter than the bolt 90. The bolt 90 inserted through the shaft hole 81a moves integrally with the alternator 51. The second accessory-side support 82 also has a similar shaft hole 82a.

Meanwhile, the engine-side supports 70 include a first engine-side support 71 and a second engine-side support 72. The first engine-side support 71 is formed as a part separate from the engine body 10. The second engine-side support 72 is integrated with the engine body 10 (specifically, the cylinder block 11), and is located below the first engine-side support 71. As shown in FIG. 6, the first and second engine-side supports 71 and 72 are both disposed on the front portion 10b of the engine body 10.

Specifically, as shown in FIGS. 6 and 8-9, the first engine-side support 71 has a shaft hole 71a through which the bolt 90 is inserted, a slot 71c, and an intermediate portion 71b. The slot 71c is formed to be adjacent to the shaft hole 71a in a substantially horizontal direction and to be closer to the engine body 10 than the shaft hole 71a is, and extends substantially horizontally. The intermediate portion 71b is interposed between the shaft hole 71a and the slot 71c, and is formed to restrict the movement of the bolt 90 toward the engine body 10. The shaft hole 71a, the intermediate portion 71b, and the slot 71c are arranged substantially horizontally. The first engine-side support 71 further has a fastening hole 71d for fixing the first engine-side support 71 to the front portion 10b of the engine body 10 (specifically, the cylinder block 11).

Specifically, just like the shaft hole 81a of the first accessory-side support 81, the shaft hole 71a has a circular cross section, and has a slightly larger diameter than the bolt 90.

The single bolt 90 is inserted into the shaft hole 71a of the first engine-side support 71 and the shaft hole 81a of the first accessory-side support 81 in the direction in which the crankshaft extends, and is fastened from its one end in the direction in which the crankshaft extends, thereby fixing the alternator 51 to the engine body 10.

The slot 71c has an oval cross section elongated horizontally. The diameter of the oval is substantially equal to that of the shaft hole 81a. Consequently, inserting the bolt 90 through the slot 71c, for example, allows the bolt 90 to move toward, and away from, the engine body 10 in the longitudinal direction of the slot 71c (in a substantially horizontal direction).

Note that even if the bolt 90 slides in the slot 71c together with the alternator 51, the horizontal size of the slot 71c is set to be short enough to prevent the alternator 51 and the engine body 10 from interfering with each other. The shaft hole 71a is also positioned to provide an intended crush stroke.

The intermediate portion 71b according to this embodiment has a through hole having two open horizontal ends. Specifically, as shown in FIG. 9, one open end of the through hole of the intermediate portion 71b (remote from the engine body 10) is continuous with the shaft hole 71a, whereas the other open end thereof (near the engine body 10) is continuous with the slot 71c. The vertical width of the through hole is less than that of the shaft hole 71a (i.e., the diameter of the shaft hole 71a). In this manner, the shaft hole 71a and the slot 71c are connected together through the through hole of the intermediate portion 71b. However, the through hole narrower than the shaft hole 71a allows the movement of the bolt 90, inserted through the shaft hole 71a, toward the engine body 10 (i.e., the movement of the bolt 90 from the shaft hole 71a to the slot 71c) to be restricted by the intermediate portion 71b. As described above, the bolt 90 inserted through the shaft hole 81a moves integrally with the alternator 51. Thus, provision of the intermediate portion 71b allows the relative movement of the alternator 51 and the engine body 10 (in particular, the movement of the alternator 51 and the engine body 10 toward each other) to be restricted.

As shown in FIGS. 6, 8, and 10, the second engine-side support 72 has a configuration generally similar to that of the first engine-side support 71. Specifically, the second engine-side support 72 has a shaft hole 72a through which another bolt (a different bolt from the bolt inserted through the first engine-side support 71) 90 is inserted, a slot 72c, and an intermediate portion 72b. The slot 72c is formed to be adjacent to the shaft hole 72a in a substantially horizontal direction and to be closer to the engine body 10 than the shaft hole 72a is, and extends substantially horizontally. The intermediate portion 72b is interposed between the shaft hole 72a and the slot 72c, and is formed to restrict the movement of the associated bolt 90 toward the engine body 10.

As shown in FIG. 10, the shaft hole 72a of the second engine-side support 72 opens obliquely upward. This allows the bolt 90 inserted through the alternator 51 to be placed on the surface of the shaft hole 72a through the open portion of the shaft hole 72a. This helps assemble the alternator 51 onto the engine body 10.

The slot 72c and the intermediate portion 72b have a configuration similar to those of the first engine-side support 71, and are thus not described in detail.

The first engine-side support 71 is configured such that an external force F acting on the alternator 51 toward the engine body 10 acts on the intermediate portion 71b via the associated bolt 90. In this embodiment, the strength of the intermediate portion 71b is set to remove a restriction on the associated bolt 90 and guide the associated bolt 90 from the shaft hole 71a to the slot 71c in a situation where the external force F exceeds a predetermined threshold Ft.

Note that the strength of the intermediate portion 71b is set based on the size of the through hole of the intermediate portion 71b, and the rigidity of a region surrounding the intermediate portion 71b, for example.

Specifically, if the external force F acts on the alternator 51 toward the engine body 10, the bolt 90 supported to move integrally with the alternator 51 applies a load corresponding to the magnitude of the external force F to the intermediate portion 71b. If the external force F exceeds at least the predetermined threshold Ft, which is set to be greater than the tension T of the power transmission belt 69 (F>Ft>T), the bolt 90 is press-fitted into the intermediate portion 71b. The bolt 90 press-fitted into the intermediate portion 71b moves from the shaft hole 71a to the slot 71c while pressing and extending the intermediate portion 71b upward and downward. The bolt 90 that has reached the slot 71c slides integrally with the alternator 51 in the direction in which the slot 71c extends.

The second engine-side support 72 is also configured such that an external force F acting on the alternator 51 toward the engine body 10 acts on the intermediate portion 72b via the associated bolt 90. The strength of the intermediate portion 72b is set to remove a restriction on the associated bolt 90 and guide the associated bolt 90 from the shaft hole 72a to the slot 72c in a situation where the external force F exceeds the threshold Ft.

Note that the threshold Ft is appropriately set in accordance with the configuration of the engine 1 (e.g., the configuration of the double arm tensioner 66).

For example, a collision load applied from the front to the motor vehicle 100 causes the front side frames 101 to positively buckle and become deformed, thereby allowing the bumper reinforcement 102 to move toward the engine body 10. This allows the bumper reinforcement 102 to come into contact with, and crush, the intake manifold 21. Thus, the intake manifold 21 absorbs at least part of the collision load.

As described above, the engine body 10 is mounted such that the alternator 51 faces toward the front of the vehicle, and the height of the alternator 51 is set to be substantially equal to that of the bumper reinforcement 102. Thus, the bumper reinforcement 102 crushes the intake manifold 21, and then comes into contact with the alternator 51 from the front. Such contact exerts an external force toward the engine body 10 on the alternator 51. If the external force exceeds, for example, the threshold Ft, the engine-side supports 70 remove restrictions imposed by the intermediate portions 71b and 72b.

Then, the upper and lower bolts 90 and 90 are guided from the shaft holes 71a and 72a to the slots 71c and 72c in the upper and lower engine-side supports 71 and 72, respectively. These slots 71c and 72c both extend substantially horizontally toward the engine body 10. Thus, the upper and lower bolts 90 and 90 move toward the engine body 10 in accordance with the external force F.

Such movement of both of the upper and lower bolts 90 and 90 toward the engine body 10 allows the alternator 51 configured to move integrally with the bolts 90 and 90 to also move toward the engine body 10. A crush stroke equal to the distance over which the alternator 51 moves can be provided.

In addition, the slots 71c and 72c of the engine-side supports 71 and 72 both extend substantially horizontally. Thus, if another engine accessory 50, (i.e., the air compressor 52) is attached below the alternator 51 as in this embodiment, the distance between the accessories can be made narrower than, for example, if the slots 71c and 72c are curved to protrude downward. Consequently, if a common power transmission belt 69 is wound between the alternator 51 and the air compressor 52, the length of each of portions of the power transmission belt 69 which are not in contact with the associated pulleys can be relatively reduced. This can reduce the degree to which the power transmission belt 69 flutters, and can, in turn, reduce noise caused by fluttering.

If the slots 71c and 72c were curved to protrude upward, the movement of the alternator 51 toward the engine body 10 could cause the alternator 51 to interfere with a part disposed above the alternator 51. Extending the slots 71c and 72c horizontally as in this embodiment eliminates such a concern. This configuration can provide a high degree of flexibility in the location at which the part to be disposed above the alternator 51 is attached.

Since the slots 71c and 72c are parallel to each other, and extend in a straight line, the alternator 51 can be smoothly moved toward the engine body 10.

While no predetermined external force acts on the bolts 90 and 90 respectively inserted into the shaft holes 71a and 72a, the intermediate portions 71b and 72b each restrict the movement of an associated one of the bolts 90 and 90. This can stabilize the positioning of the alternator 51, and can, in turn, provide uniform quality.

In this manner, while the degree to which the power transmission belt 69 flutters is reduced, and the positioning of the alternator 51 is stabilized, a crush stroke is provided.

In addition, as described above, changing the shape of the horizontally extending through hole of the first engine-side support 71 enables the formation of the shaft hole 71a, the intermediate portion 71b, and the slot 71c. Specifically, the horizontally extending through hole can be sectioned into the shaft hole 71a, the intermediate portion 71b, and the slot 71c simply by reducing the width of a portion of the horizontally extending through hole. This helps easily form the first engine-side support 71 having the intermediate portion 71b. A similar statement applies to the second engine-engine-side support 72.

In addition, since the alternator 51 and the bumper reinforcement 102 have substantially the same height as described above, the intermediate portions 71b and 72b can effectively absorb a collision load acting on the alternator 51 via the bumper reinforcement 102. This helps improve occupant protection performance.

OTHER EMBODIMENTS

In the foregoing embodiment, an engine-side support having a horizontally extending through hole having a narrower portion has been described as an exemplary engine-side support 70. However, this configuration is merely an example of the present disclosure.

Figure 11:
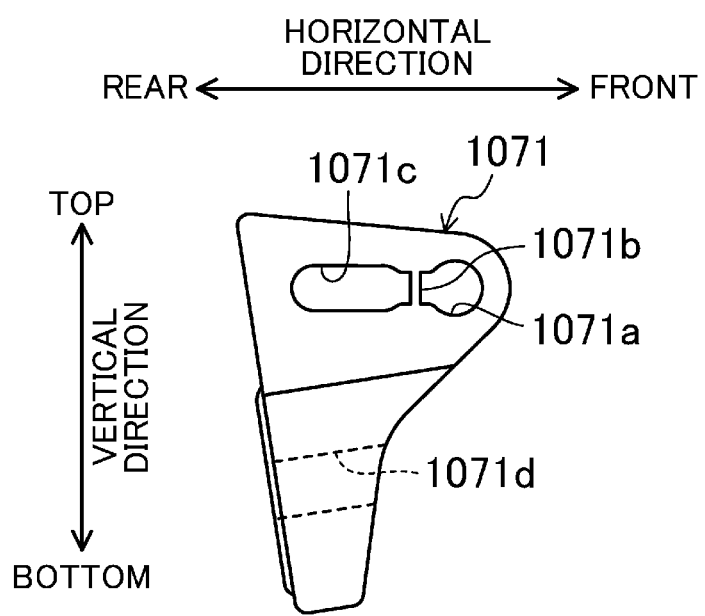
FIG. 11 illustrates a variation of an engine-side support, and corresponds to FIG. 9.

FIG. 11 illustrates a variation 1071 of the first engine-side support 71, and corresponds to FIG. 9. In this variation 1071, a portion of a through hole is provided with a thin plate (an intermediate portion) 1071b instead of having a narrower width. The strength of the thin plate 1071b is set such that the thin plate 1071b is broken by an associated one of the bolts 90 if the external force F acting on the alternator 51 toward the engine body 10 exceeds a predetermined threshold Ft, which is set to be greater than the tension T of the power transmission belt 69 (F>Ft>T). A break in the thin plate 1071b allows the associated bolt 90 to be guided from a shaft hole 1071a to a slot 1071c. The shaft hole 1071a and the slot 1071c each have substantially the same configuration as a counterpart of the first engine-side support 71.

Note that the strength of the thin plate 1071b is set based on, for example, the material and thickness of the thin plate 1071b.

In addition, while an intermediate portion of one of engine-side supports 70 may be configured as a thin plate, an intermediate portion of the other one of the engine-side supports 70 may be configured as a narrow through hole.

In the foregoing embodiment, the engine-side supports each have an intermediate portion and a slot. However, this configuration is merely an example of the present disclosure. The engine-side supports may each have only a shaft hole, and the accessory-side supports may each have an intermediate portion and a slot.

Figure 12:
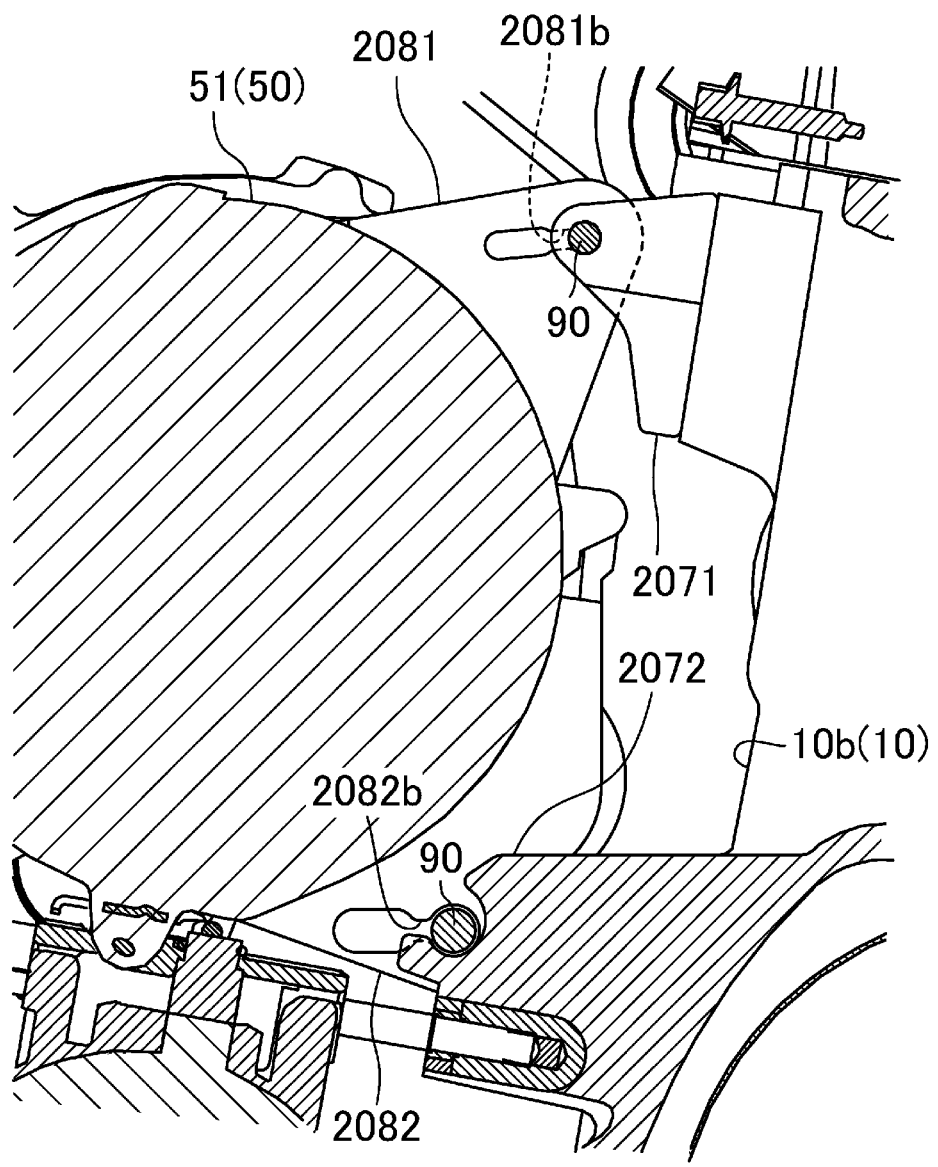
FIG. 12 illustrates another variation of an engine-side support and a variation of an accessory-side support, and corresponds to FIG. 5.

FIG. 12 illustrates such a configuration, and corresponds to FIG. 5.

Specifically, in this example, accessory-side supports 2081 and 2082 each have a shaft hole into which an associated one of bolts 90 and 90 is inserted, a slot, and an associated one of intermediate portions 2081b and 2082b. The reference character denoting the shaft hole is omitted. The slot extending horizontally is formed to be adjacent to the shaft hole in a horizontal direction and to be further away from the engine body 10 than the shaft hole is. The reference character denoting the slot is omitted. The intermediate portions 2081b and 2082b are each interposed between the associated shaft hole and the associated slot to restrict the movement of an associated one of the bolts 90 and 90 in a direction away from the engine body 10.

Meanwhile, engine-side supports 2071 and 2072 each have a shaft hole into which an associated one of the bolts 90 and 90 is inserted.

In the example shown in FIG. 12, the accessory-side supports 2081 and 2082 are each designed to remove a restriction imposed by an associated one of the intermediate portions 2081b and 2082b and then guide the associated bolt 90 from the associated shaft hole to the associated slot if the external force acting on the alternator 51 toward the engine body 10 exceeds a predetermined threshold Ft, which is set to be greater than the tension T of the power transmission belt 69.

According to this configuration, while, as in the foregoing embodiment, the degree to which the power transmission belt 69 flutters is reduced, and the positioning of the alternator 51 is stabilized, a crush stroke is provided.

In addition, a pair of upper and lower engine-side supports and a pair of upper and lower accessory-side supports are merely examples of the present disclosure. Three or more supports may be provided. In addition, engine-side supports or accessory-side supports do not always have to be arranged in an up and down direction. The direction in which the engine-side supports or the accessory-side supports are arranged may be changed to an appropriate direction (e.g., an obliquely upward or downward direction).

In the foregoing embodiment, the alternator 51 is arranged to face toward the front of the vehicle 100. This arrangement is merely an example of the present disclosure. For example, the alternator 51 may be arranged to face toward one side of the vehicle 100 (toward one side of the vehicle in the vehicle width direction). Such arrangement provides the operational advantages described above when a collision load is applied from the side of the vehicle 100 to the vehicle 100.

What is claimed is:

1. An accessory support structure for a vehicle engine, the structure comprising:
    an engine body mounted on a vehicle;
    an engine accessory disposed along an accessory-side outer surface of the engine body;
    a pair of accessory-side supports provided on an engine facing portion of the engine accessory; and
    a pair of engine-side supports provided on the accessory-side outer surface of the engine body, the engine-side supports being disposed at locations corresponding to the accessory-side supports, respectively, wherein
    the engine accessory is fixed through first and second support shafts inserted, respectively, into each accessory-side support and one of the engine-side supports corresponding to the accessory-side support,
    the accessory-side supports each have
        a first shaft hole into which one of the first and second support shafts is inserted,
    the engine-side supports each have
        a second shaft hole into which the one of the first and second support shafts support shaft is inserted,
        a slot adjacent to the second shaft hole in a substantially horizontal direction and closer to the engine body than the shaft hole of the engine-side support is, the slot extending substantially horizontally,
        an intermediate portion interposed between the second shaft hole and the slot to restrict movement of the common support shaft toward the engine body,
        the second shaft hole, the slot, and the intermediate portion of each engine-side support are arranged in a substantially horizontal direction,
    the engine-side supports are each configured such that an external force that has acted on the engine accessory toward the engine body acts on an associated one of the intermediate portions through the one of the first and second support shafts, and
    a strength of each intermediate portion is set to remove a restriction on one of the first and second support shafts if the external force exceeds a predetermined threshold.

2. An accessory support structure for a vehicle engine, the structure comprising:
    an engine body mounted in a vehicle;
    an engine accessory disposed along an outer surface of the engine body;
    a pair of accessory-side supports provided on an accessory-side engine facing portion of the engine accessory; and
    a pair of engine-side supports provided on the accessory-side of the outer surface of the engine body, the engine-side supports being disposed at locations corresponding to the accessory-side supports, respectively, wherein
    the engine accessory is fixed through first and second support shafts inserted, respectively, into each accessory-side support and one of the engine-side supports corresponding to the accessory-side support,
    the accessory-side supports each have
        a first shaft hole into which one of the first and second support shafts is inserted,
        a slot adjacent to the first shaft hole in a substantially horizontal direction and further away from the engine body than the first shaft hole is, the slot extending substantially horizontally,
        an intermediate portion interposed between the first shaft hole and the slot to restrict movement of the common support shaft in a direction away from the engine body,
        the first shaft hole, the slot, and the intermediate portion of each accessory-side support are arranged in a substantially horizontal direction,
    the engine-side supports each have
        a second shaft hole into which the one of the first and second support shafts is inserted,
    the accessory-side supports are each configured such that an external force that has acted on the engine accessory toward the engine body acts on an associated one of the intermediate portions through one of the first and second support shafts, and
    a strength of each intermediate portion is set to remove a restriction on the common support shaft if the external force exceeds a predetermined threshold.

3. The accessory support structure of claim 1, wherein
    the second shaft hole and the slot are open to a vehicle width direction,
    at least one of the intermediate portions is configured as a narrowed portion that opens to the vehicle width direction and connected to the second shaft hole and the slot, a vertical width of the narrowed portion that is open is narrower than the second shaft hole and the slot.

4. The accessory support structure of claim 2, wherein
    the second shaft hole and the slot are open to a vehicle width direction,
    at least one of the intermediate portions is configured as a narrowed portion that opens to the vehicle width direction and connected to the second shaft hole and the slot, a vertical width of the narrowed portion that is open is narrower than the second shaft hole and the slot.

5. A structure for a vehicle, the structure comprising:
    the accessory support structure of claim 1;
    a pair of side frames respectively disposed on both sides of the engine body in a width direction of the vehicle and extending in a longitudinal direction of the vehicle; and
    a front frame bridged between front ends of the pair of side frames, wherein
    the engine body is mounted such that the engine accessory faces toward a front of the vehicle, and
    the engine accessory is disposed at a height equal to that of the front frame.

6. A structure for a vehicle, the structure comprising:
    the accessory support structure of claim 2;

a pair of side frames respectively disposed on both sides of the engine body in a width direction of the vehicle and extending in a longitudinal direction of the vehicle; and a front frame bridged between front ends of the pair of side frames, wherein the engine body is mounted such that the engine accessory faces toward a front of the vehicle, and the engine accessory is disposed at a height equal to that of the front frame.

7. The accessory support structure for a vehicle engine of claim 1, wherein the pair of accessory-side supports are provided in an up and down direction, and the pair of engine-side supports are provided in the up and down direction.

* * * * *